H. S. GREENE.
NAPPING MACHINE.
APPLICATION FILED JUNE 18, 1917.
1,265,905.
Patented May 14, 1918.
2 SHEETS—SHEET 2.
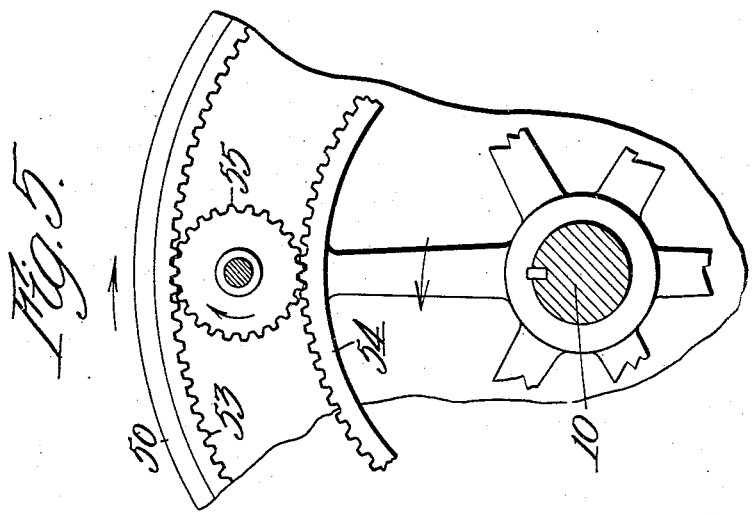
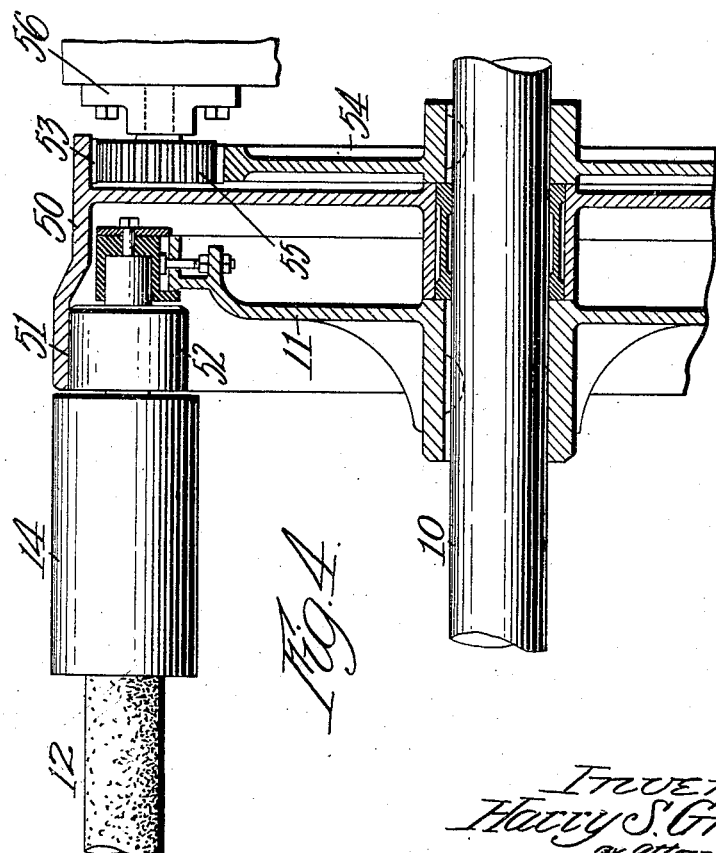

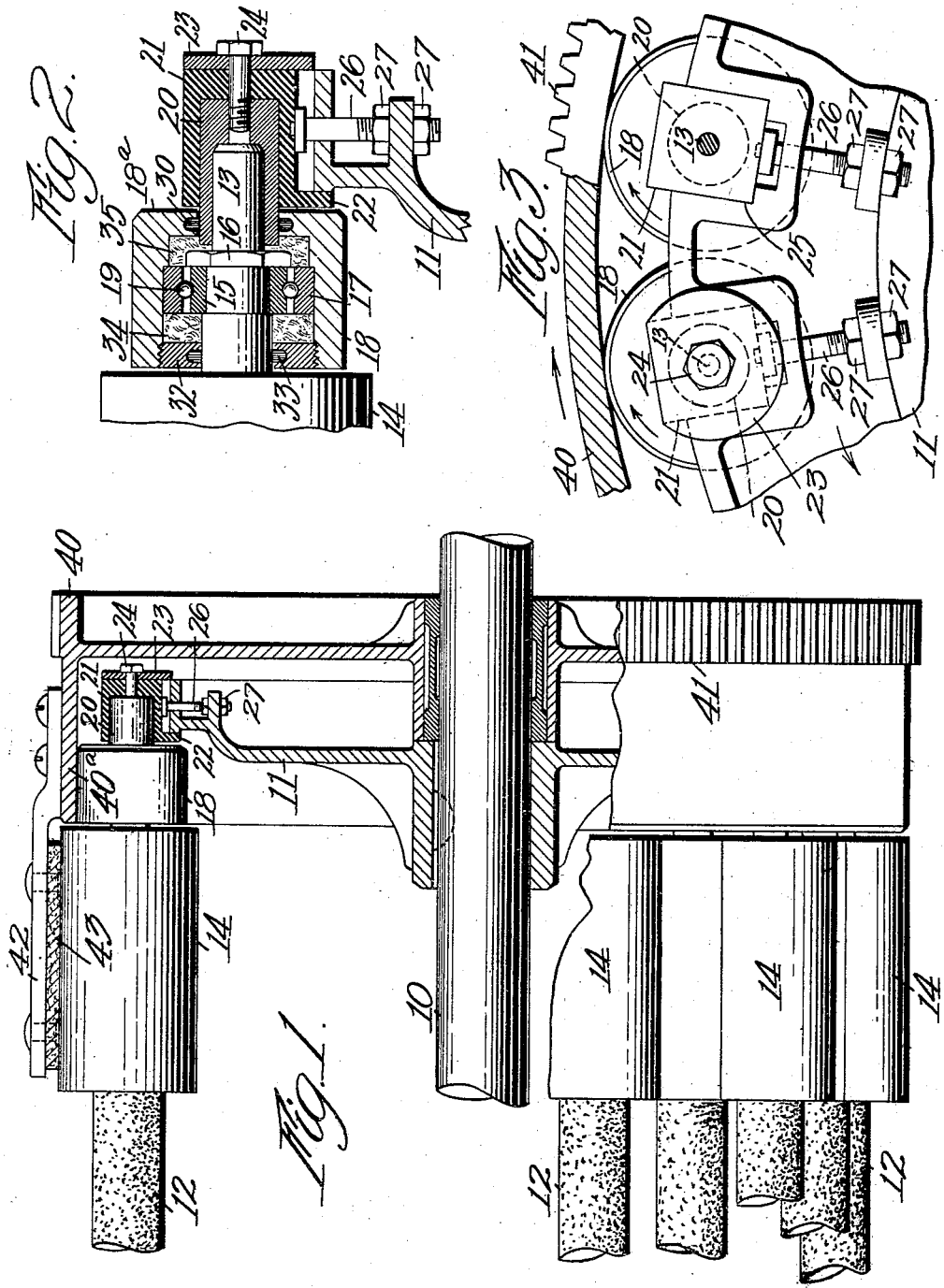

UNITED STATES PATENT OFFICE.

HARRY S. GREENE, OF WOONSOCKET, RHODE ISLAND.

NAPPING-MACHINE.

1,265,905.  Specification of Letters Patent.  Patented May 14, 1918.

Application filed June 18, 1917. Serial No. 175,367.

*To all whom it may concern:*

Be it known that I, HARRY S. GREENE, a citizen of the United States, residing at Woonsocket, in the county of Providence and State of Rhode Island, have invented a new and useful Napping-Machine, of which the following is a specification.

This invention relates to a napping machine, of the general type shown in my Reissued Patent No. 13,695, granted to me March 10, 1914.

In this prior patent I have shown a ring bearing for the napping roll shafts, this ring forming the outer bearing surface for all of the roll shafts, and being revolved relatively to the napping cylinder by the rotation of said roll shafts, thus providing a rolling bearing for each shaft. It has been found that this mechanism while very effective in normal operation, consumes a considerable amount of power when the cylinder is started upon a position of rest, and also that it sometimes permits oil from the bearings to reach the napping rolls, or the cloth being finished.

It is the general object of my present invention, therefore to modify and improve the construction shown in my prior patent, thereby securing increased efficiency and economy in operation and avoiding the defects above mentioned. To this end I have provided anti-friction or ball bearings for each napping roll shaft, each bearing having the usual inner and outer ball races. I have further provided means for positively rotating the outer ball races in the direction of rotation of the napping rolls and at approximately the same speed.

With this construction there is only slight relative movement between the inner and outer ball races when the machine is operated at normal speed, and the wear of the ball bearings is negligible. The ball bearings greatly reduce the standing friction which must be overcome when the machine is started, and by their use I have been able to make satisfactory provision for preventing the escape of grease or oil from the bearings to the napping rolls or to the cloth being finished.

My invention also relates to certain arrangement and combinations of parts which will be hereinafter described and more particularly pointed out in the appended claims.

A preferred form of my invention, and a slight modification thereof are shown in the drawings, in which—

Figure 1 is a side elevation of one end of a napping cylinder, partly in section;

Fig. 2 is a vertical sectional view of one of the roll shaft bearings;

Fig. 3 is a partial end elevation of the napping cylinder;

Fig. 4 is a vertical sectional view of a modified form of my invention, and

Fig. 5 is a partial end elevation of the mechanism shown in Fig. 4.

Referring particularly to Figs. 1, 2 and 3 I have shown a cylinder shaft 10, to which are secured napping cylinder heads 11, one only being shown. These heads support the bearings for a plurality of napping rolls 12, mounted on roll shafts 13, and each preferably provided with a driving pulley 14.

An inner ball race 15 is secured to each roll shaft 13 by a binding nut 16, and an outer ball race 17 is fixed in a cylinder or sleeve 18 which is freely rotatable about the axis of the shaft 13. The usual balls 19 complete the ball-bearings. The outer end of the shaft 13 extends loosely into a socket 20 by which the radial position of the shaft may be adjusted. The socket 20 is mounted in a casing 21 having a flange 22 at one end and a cap-plate 23 at the opposite end. The socket 20, casing 21, and plate 23 are secured together by a clamping bolt 24. Each casing and socket and the shaft mounted therein are radially adjustable in a recess 25 formed in the outer edge of the cylinder head 11. An adjusting stud 26 is provided for determining the radial position of each casing 21, said stud being secured in position by lock nuts 27.

The sleeve 18 is provided with an inwardly projecting flange 18$^a$ which is grooved in its inner edge to receive a packing 30, thus forming an oil tight joint with the outer surface of the socket 20 at one side of the ball bearing. The opposite end of the sleeve 18 is threaded to receive an annular plug or washer 32 surrounding the shaft 13 and also grooved on its inner edge to receive a packing 33 which forms an oil tight joint at the opposite side of the ball bearing. The spaces 34 and 35 between the parts 18$^a$ and 32 and the ball races, may be filled with grease or oil and the bearing will thus run for a long period of time without requiring any attention whatever.

A flanged disk 40 is mounted to rotate freely upon a bushing on the cylinder shaft 10, and one flange 40ª of the disk 40 is provided with an internal cylindrical surface which engages the outer surface of the sleeve 18. This flanged disk may be rotated at any desired speed in any convenient manner, and is shown in the drawings as provided with gear teeth 41, which may be engaged by a suitable driving gear (not shown).

It is sometimes desirable to rotate the napping rolls also from the flanged disk 40, and for this purpose I provide an arm 42 secured to the disk 40 and having attached thereto a belt 43 engaging and driving the napping roll pulleys 14.

Having described this form of my invention the operation thereof will be clearly evident. By adjusting the studs 26, the sleeves 18 may be brought into driving engagement with the internal flange 40ª of the disk 40, which will be driven at such a rate that the speed of rotation of the sleeve 18 will approximately equal the speed of rotation of the napping roll 12. If two sets of rolls driven at slightly different speeds are used, the speed of rotation of the sleeve 18 may be approximately the average speed of the two sets of rolls. The relative movement of the inner and outer races of the ball bearings will then be only the difference between the actual speed of the roll and the speed of the sleeve 18, a comparatively negligible amount.

The means shown for driving the napping rolls is merely suggestive and forms no part of my invention.

In Figs. 4 and 5 I have indicated the use of my invention in connection with plain bearings. Certain changes are also shown in the construction of the flanged disk which drives the outer bearing members.

A disk 50 having an internal cylindrical surface 51 engages the plain bearing sleeves 52 and positively rotates said sleeves. The disk 50 is loosely mounted upon the cylinder shaft 10 and is provided with internal gear teeth 53. A driving gear 54 is fixed on the shaft 10 and engages and drives an intermediate or idle gear 55 mounted upon a fixed bearing or bracket 56. The gear 55 in turn engages the internal gear 53, which it rotates in the opposite direction from the cylinder shaft 10 and gear 54, as shown by the arrows in Fig. 5.

With this construction the sleeve 52 is driven directly from the cylinder shaft 10, while in the form shown in Fig. 1, the disk 40 is rotated from some other portion of the machine.

Having thus described my invention and a modification thereof, it will be evident to those skilled in the art that other changes and modifications can be made therein without departing from the spirit and scope of my invention, as set forth in the claims, and I do not wish to be otherwise limited to the details herein disclosed, but what I claim is:

1. In a napping machine, a shaft, cylinder heads thereon, a plurality of napping rolls, bearings for said rolls supported by said heads, and means to positively rotate said bearings.

2. In a napping machine, a shaft, cylinder heads thereon, a plurality of napping rolls, ball bearings for each roll supported by said heads and each comprising an inner ball race fixed to a roll shaft and a rotatably mounted outer ball race, and means to positively rotate said outer ball race.

3. In a napping machine, a shaft, cylinder heads thereon, a plurality of napping rolls, ball bearings for said rolls spaced apart on said heads and each comprising an inner ball race fixed to a roll shaft and a rotatable outer ball race, and means to drive the outer ball race at substantially the angular velocity of the napping roll and the inner ball race.

4. In a napping machine, a shaft, cylinder heads fixed thereon, a plurality of napping rolls, mounted in spaced relation on said heads, rotatably mounted bearings for said rolls in said heads, and means to positively rotate said bearings, said means comprising flanged disks rotatable on the cylinder shaft and having internal cylindrical surfaces engaging the outer surfaces of said bearings, and means to drive said disks to rotate said bearings.

5. In a napping machine, a shaft, cylinder heads thereon, a plurality of napping rolls, bearings for said rolls rotatably mounted in said heads and means to positively rotate said bearings, said means comprising flanged disks loose on the cylinder shaft and having internal cylindrical surfaces engaging the outer surfaces of said bearings and means to drive said disks to rotate said bearings, said latter means comprising a gear fixed to the cylinder shaft and driving connections from said gear to said flanged disk.

6. In a napping machine, a shaft, cylinder heads thereon, a plurality of napping rolls, bearings for said rolls rotatably supported by said heads, and means to rotate said bearings and said rolls in fixed speed relation.

In testimony whereof I have hereunto affixed my signature.

HARRY S. GREENE.

Witnesses:
FRANCES L. COYLE,
GEORGE W. GREENE, Jr.